US011892975B1

(12) United States Patent
Rubin-Smith

(10) Patent No.: US 11,892,975 B1
(45) Date of Patent: Feb. 6, 2024

(54) ASYNCHRONOUS CONSISTENT SNAPSHOTS IN A DISTRIBUTED SYSTEM

(71) Applicant: Amazon Technologies, Inc., Seattle, WA (US)

(72) Inventor: Eric Andrew Rubin-Smith, Fairfax, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 113 days.

(21) Appl. No.: 17/491,429

(22) Filed: Sep. 30, 2021

(51) Int. Cl.
   *G06F 16/11* (2019.01)
(52) U.S. Cl.
   CPC .................................. *G06F 16/128* (2019.01)
(58) Field of Classification Search
   CPC ..................................................... G06F 16/128
   USPC .......................................................... 707/649
   See application file for complete search history.

(56) References Cited

U.S. PATENT DOCUMENTS

| 11,360,689 | B1* | 6/2022 | Grunwald | G06F 3/0616 |
| 11,575,647 | B1* | 2/2023 | Rubin-Smith | H04L 61/5061 |
| 2015/0134637 | A1* | 5/2015 | Pall | G06F 16/9024 |
| | | | | 707/718 |
| 2015/0154262 | A1* | 6/2015 | Yang | G06F 16/2358 |
| | | | | 707/649 |
| 2017/0193031 | A1* | 7/2017 | Papapanagiotou | ......... |
| | | | | G06F 11/1451 |

* cited by examiner

*Primary Examiner* — Robert W Beausoliel, Jr.
*Assistant Examiner* — Lauren Zannah Ganger
(74) *Attorney, Agent, or Firm* — Thomas|Horstemeyer, LLP

(57) ABSTRACT

Disclosed are various embodiments for asynchronously generating consistent snapshots in a distributed system. In one embodiment, a snapshotting agent receives a respective local snapshot for individual processes in a distributed system. The respective local snapshot for a corresponding process includes a corresponding vector clock that comprises respective values indicating respective state changes in the corresponding process and other processes. The snapshotting agent determines whether a collection of the respective local snapshots for the individual processes represents a global consistent snapshot for the distributed system based at least in part on a comparison of the respective values of the corresponding vector clocks.

20 Claims, 8 Drawing Sheets

ASYNCHRONOUS CONSISTENT SNAPSHOTS IN A DISTRIBUTED SYSTEM

BACKGROUND

Distributed systems can include a large number of distinct processes executing across many different computing devices that communicate via computer networking. In some cases, a distributed system may have a global reach, where constituent processes and subsystems are distributed on different continents and across oceans. In other cases, distributed systems may span multiple data centers or may exist entirely within a data center. In order to achieve common objectives, subsystems of distributed systems may communicate with one or more other subsystems using message passing over a network.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
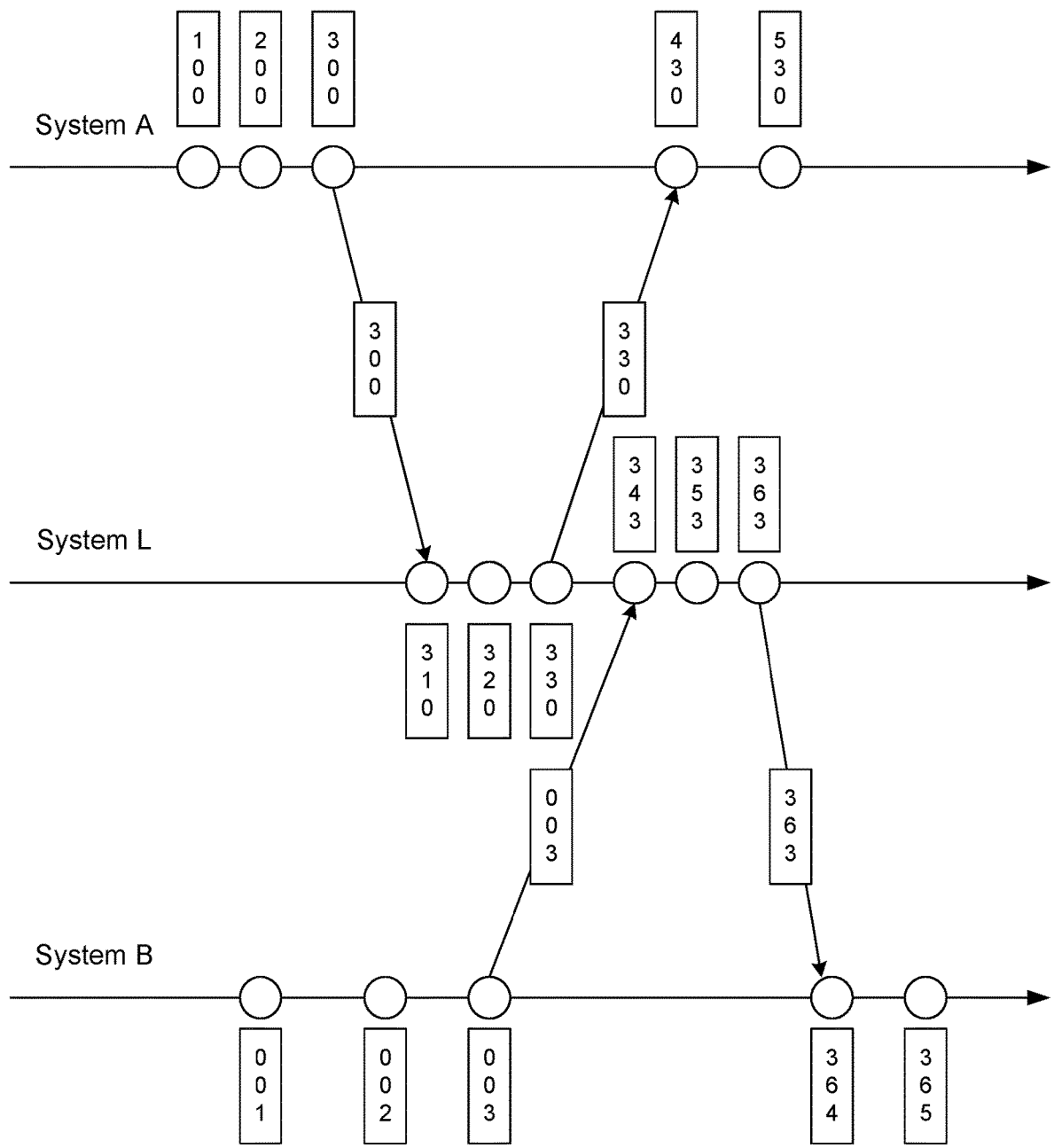
FIG. 1A is a drawing of an example scenario involving generation of vector clocks by processes in a distributed system according to various embodiments of the present disclosure.

The present disclosure relates to approaches for generating consistent snapshots in a distributed system, where the snapshots of different portions of the system can be captured asynchronously. A snapshot corresponds to a set of data describing the state of the different processes in a distributed system at a given point in time. Snapshots may be useful for a variety of reasons. First, a snapshot of a distributed system may be used for disaster recovery. Second, a snapshot may be used in various extract-transform-load (ETL) scenarios, where the snapshotted data is transformed in order for the system data to be queried faster. Third, snapshots may be used in auditing, such as in using a live auditor to check invariants for the distributed system, for example, to ensure that the system is not producing false positives or false negatives.

Generating a consistent snapshot of a distributed system is a difficult problem. One approach to generate a snapshot is to query each of the processes simultaneously, but this may produce a snapshot that is inconsistent rather than consistent. For example, responding to the query may take different amounts of time for different processes. If a process is allowed to continue executing while the snapshot data is being returned, the state of the process may mutate or be changed. In some cases, while the snapshot is being generated, messages may be passed between processes, affecting the state of multiple processes and leading to inconsistency. Also, particularly with globally distributed systems, the network transit time may vary between the snapshotting agent and different processes, thereby leading to inconsistencies as queries are not received at the same point in time.

Another approach to generating snapshots may require each process to stop and generate a snapshot periodically at defined times or in response to message passing. This could resolve the problem of state changes occurring during a variable length snapshotting process. Moreover, pausing the processes imposes extra latency on the central function of the system, which can manifest to users as slow response times. Also, by imposing a pause to generate a snapshot, the logic implementing the snapshotting process becomes bound to the business logic of the system, making it harder to maintain the system and add features.

Various embodiments of the present disclosure introduce practical approaches for generating globally consistent snapshots asynchronously for distributed systems. Rather than requiring processes to stop for a snapshot requested by a snapshotting agent, each process in the system is permitted to spontaneously take a local snapshot at any desired time. In various implementations, the processes may take local snapshots on a regular timed cadence, upon receiving a message from another process, in response to an internal state that changes, and so forth. This approach can be considered asynchronous because the processes may take their local snapshots independently of one another and/or independently of the snapshotting agent. A snapshotting agent then is able to collect these asynchronously generated local snapshots and combine them into a global consistent snapshot when it is possible to do so.

As will be described, each of the local snapshots incorporates a vector clock with values for the local process and other processes in the distributed system, and the snapshotting agent compares the vector clock values among the collected local snapshots to ensure consistency among the local snapshots. If the collection of the most recent local snapshots are not consistent as determined from the vector clock values, the snapshotting agent may refer to previous local snapshots in order to generate a most recent globally consistent snapshot.

As one skilled in the art will appreciate in light of this disclosure, certain embodiments may be capable of achieving certain advantages, including some or all of the following: (1) reducing latency in distributed computing systems by enabling global consistent snapshots to be generated without a mode change in the system processes; (2) improving flexibility in the design and maintenance of computer systems by separating snapshot generation from the system process logic; (3) improving recovery from failures in the distributed system by allowing for distributed snapshot generation; (4) improving the functioning of distributed systems by providing snapshots that do not contain inconsistencies; (5) improving the functioning of computer networks by reducing network traffic since in various embodiments there is no centralized component sending messages instructing each of the distributed components to capture a snapshot at a particular point in time; and so forth.

Referring now to FIG. 1A, shown is an example scenario involving generation of vector clocks by processes in a distributed system. Timelines are shown for three example systems in a distributed system: System A, System L, and System B. Each circle shown on the respective timelines corresponds to a distinct step or task that may mutate the state of the respective system. The format of the example vector clocks includes the value for System A over the value for System L over the value for System B.

A system increments its value for its vector clock at each successive step. For example, System A performs three steps and increments its value for itself each time: 1, 2, and 3. The values in System A's vector clocks for System L and System B remain at an initialization value, such as 0. Other initialization values such as a time at initialization may be used in other implementations. The arrows between the system timelines represent message communications between the systems. At the third step, System A sends a message to System L. For example, System A may be requesting exclusive access to a resource maintained by System L.

In sending messages, each system includes a copy of its current vector clock. For example, System A includes a copy of its vector clock showing values [3 0 0] in sending the message at step 3 to System L. Upon receipt of the vector clock, System L updates its vector clock to the pairwise maximum of values in its vector clock compared to the System A vector clock, which is [3 1 0]. In this example, at its second step, System L determines to grant exclusive access to the requested resource to System A. System L then sends a message to System A granting System A's request. This message includes System L's current vector clock [3 3 0], which System A then uses to update its own vector clock by the pairwise maximum, producing [4 3 0].

It is noted that System A's vector clocks remain with zero values for System B throughout the five steps of this example, as System A does not learn of System B's vector clock values. This means that actions taken by System B do not affect the state of System A. Likewise, System B does not learn of System A's or System L's values until after System B's third step.

While System A requests and reserves the resource of System L, System B proceeds with three steps. At the third step, System B sends its vector clock, [0 0 3], to System L while requesting access to its exclusive resource. System L updates its vector clock to [3 4 3] using the pairwise maximum, and then determines at its fifth step that the exclusive resource has already been reserved to System A. At the sixth step, System L informs System B that the resource has already been reserved and sends System L's vector clock of [3 6 3] to System B. System B then updates its vector clock using the pairwise maximum to [3 6 4].

In this way, System B first learns of the values for System A and System L, which were previously unknown to System B. Moreover, System B's vector clock now has the value corresponding to the third step of System A. This shows that the action taken by System A at its third step has potentially (and this case actually) affected the operation or state of System B. That is to say, by reserving the resource of System L, System A has prevented System B from reserving the same resource.

Figure 1B:
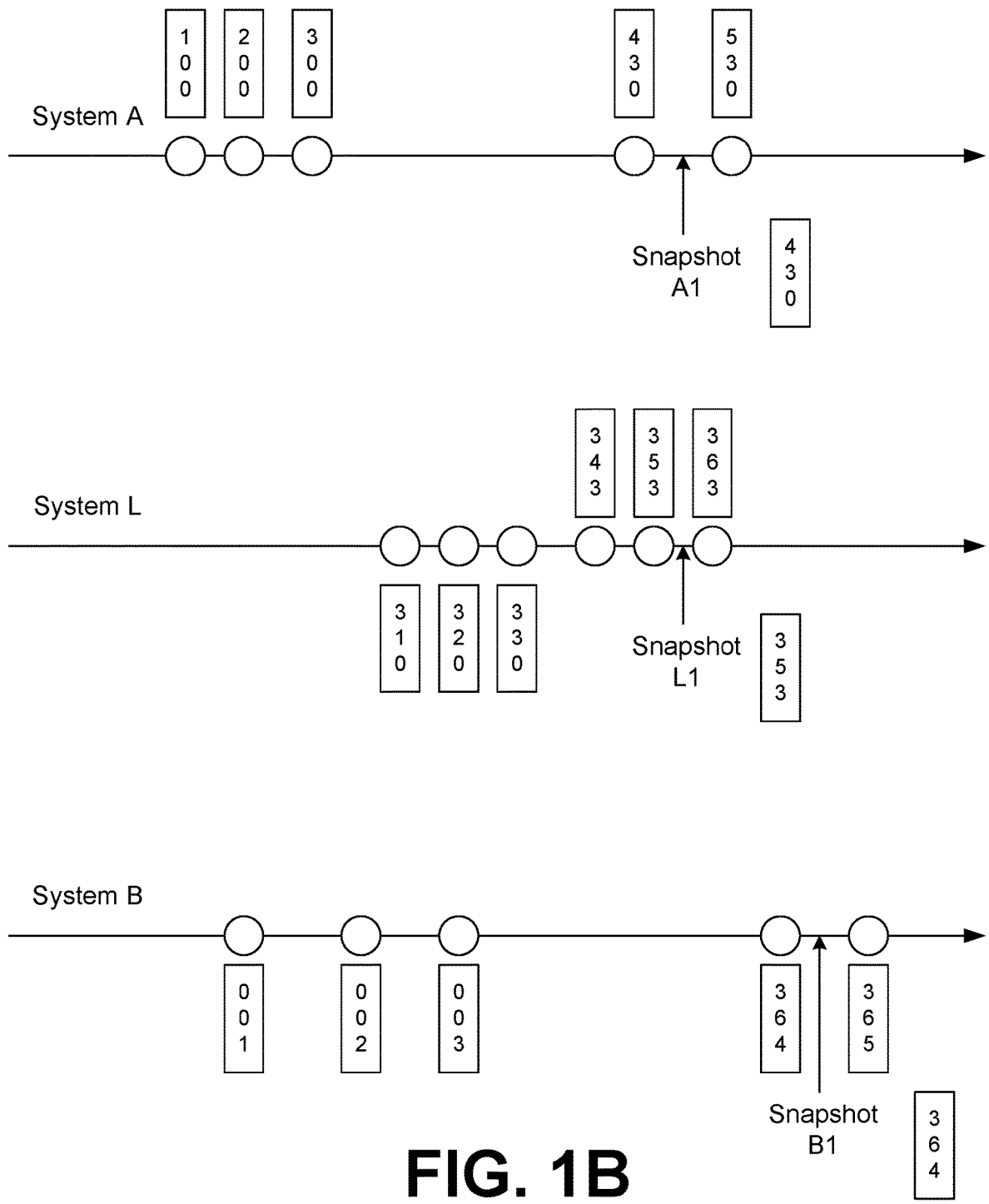
FIG. 1B is a drawing of an example scenario of asynchronously generating local snapshots using the example scenario of FIG. 1A according to various embodiments of the present disclosure.

Turning now to FIG. 1B, shown is an example scenario of asynchronously generating local snapshots using the example scenario of FIG. 1A. The systems may be configured to take snapshots at a particular cadence or interval, but clock skew and differing latencies in preparing snapshots may cause the snapshots to represent different times and be inconsistent. In this example, Snapshot A1 is taken of System A, which is associated with the vector clock [4 3 0]. Snapshot L1 is taken of System L, which is associated with the vector clock [3 5 3]. Snapshot B1 is taken of System B, which is associated with the vector clock [3 6 4].

Under the principles of the present disclosure, an agent can determine a set of local snapshots to be globally consistent if the value for a first system in its own vector clock is greater than or equal to that of the respective values for the first system in the vector clocks of the other systems. Thus, the agent would compare the first value in Snapshot A1's vector clock with the first values in the vector clocks of Snapshot L1 and B1 to ensure that the first value in Snapshot A1's vector clock is greater than or equal to the first values in the vector clocks of Snapshot L1 and B1. In this example, 4 is greater than or equal to 3 and 3, so the condition is satisfied.

The same method of comparison is performed for the third value in Snapshot B1's vector clock to ensure that the value is greater than or equal to the third values of Snapshot A1's and Snapshot L1's vector clocks. In this example, 4 is greater than or equal to 0 and 3, so the condition is also satisfied.

However, when the same method of comparison is performed for the second value of Snapshot Lis vector clock as compared to the second values of Snapshot A1's and Snapshot B1's vector clocks, the condition fails. In this case, 5 is greater than 3 (from Snapshot A1's vector clock), but 5 is not greater than or equal to 6 (from Snapshot B1's vector clock). Because one condition fails, the set of local snapshots shown in FIG. 1B is determined to be inconsistent.

Figure 1C:
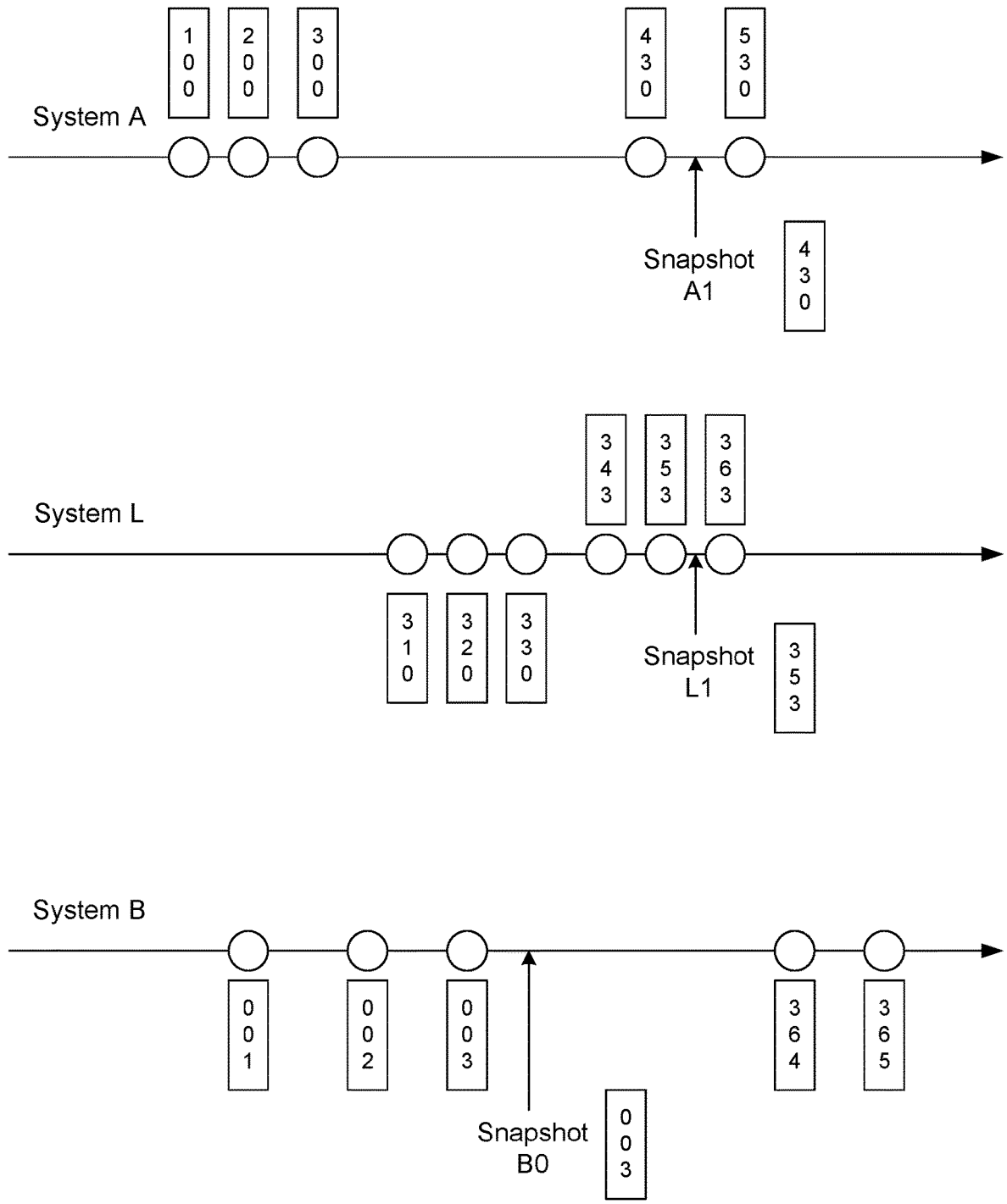
FIG. 1C is a drawing of another example scenario of asynchronously generating local snapshots using the example scenario of FIG. 1A according to various embodiments of the present disclosure.

Turning now to FIG. 1C, shown is another example scenario of asynchronously generating local snapshots using the example scenario of FIG. 1A. Since the set of local snapshots from FIG. 1B has been determined to be inconsistent, the agent may be configured to generate a most recent global consistent snapshot by working backwards using one or more previous local snapshots until a global consistent snapshot is found.

In this example, the agent locates a previous Snapshot B0 from System B, which has the vector clock [0 0 3]. The verifications are performed again with respect to Snapshot A1 and Snapshot L1, but this time using Snapshot B0. Thus, the agent would compare the first value in Snapshot A1's vector clock with the first values in the vector clocks of Snapshot L1 and B0 to ensure that the first value in Snapshot A1's vector clock is greater than or equal to the first values in the vector clocks of Snapshot L1 and B0. In this example, 4 is greater than or equal to 3 and 0, so the condition is satisfied. The same method of comparison is performed for the third value in Snapshot B0's vector clock to ensure that the value is greater than or equal to the third values of Snapshot A1's and Snapshot L1's vector clocks. In this example, 3 is greater than or equal to 0 and 3, so the condition is also satisfied.

When the same method of comparison is performed for the second value of Snapshot Lis vector clock as compared to the second values of Snapshot A1's and Snapshot B0's vector clocks, the condition also succeeds, in contrast to FIG. 1B. In this case, 5 is greater than 3 (from Snapshot A1's vector clock), and 5 is greater than or equal to 0 (from Snapshot B0's vector clock). Because all conditions are met, the set of local snapshots shown in FIG. 1C is determined to be globally consistent. In the following discussion, a general description of the system and its components is provided, followed by a discussion of the operation of the same.

Figure 2:
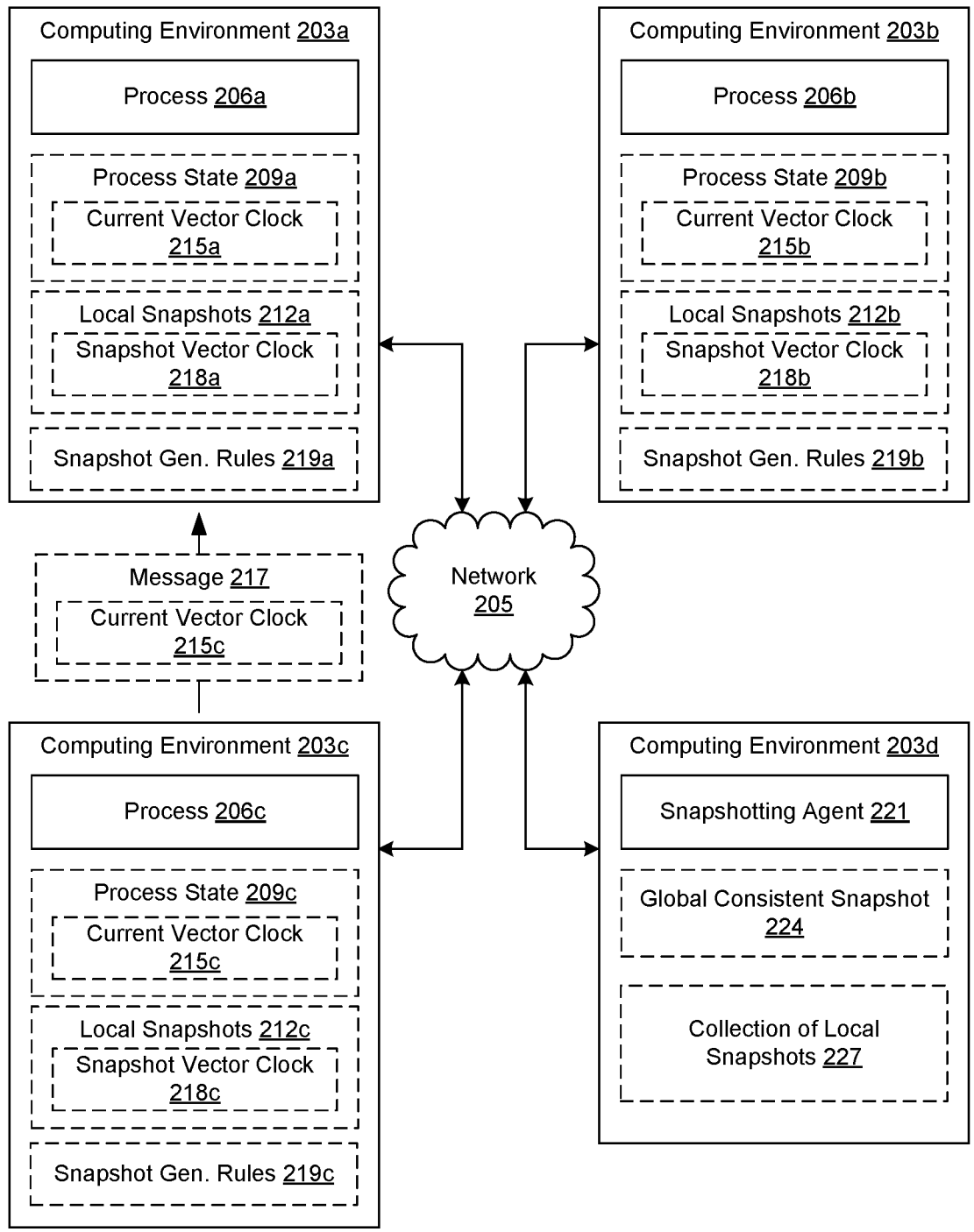
FIG. 2 is a schematic block diagram of a networked environment according to various embodiments of the present disclosure.

With reference to FIG. 2, shown is a networked environment 200 according to various embodiments. The networked environment 200 may correspond to a distributed system. The networked environment 200 includes a plurality of computing environments 203a, 203b, 203c, and 203d, which are in data communication with each other via a network 205. The network 205 includes, for example, the Internet, intranets, extranets, wide area networks (WANs), local area networks (LANs), wired networks, wireless networks, cable networks, satellite networks, or other suitable networks, etc., or any combination of two or more such networks.

In some embodiments, the networked environment 200 may comprise one or more cloud provider networks. The cloud provider network can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network resources and services using one or more application programming interfaces (APIs). An API refers to an interface and/or communication protocol between a client device and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network, for example it may not be possible to route from a substrate network address to an address in a production network that runs services of the cloud provider, or to a customer network that hosts customer resources.

The cloud provider network can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of an overlay internet protocol (IP) and a network identifier to a substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

The traffic and operations of the cloud provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network include a flag to indicate whether the traffic is control plane traffic or data plane traffic. In some embodiments, the payload of traffic may be inspected to determine its type (e.g., whether control or data plane). Other techniques for distinguishing traffic types are possible.

The data plane can include one or more computing devices, which may be bare metal (e.g., single tenant) or may be virtualized by a hypervisor to run multiple VMs or machine instances or microVMs for one or more customers. These compute servers can support a virtualized computing service (or "hardware virtualization service") of the cloud provider network. The virtualized computing service may be part of the control plane, allowing customers to issue commands via an API to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers, which can include persistent storage for storing volumes of customer data, as well as software for managing these volumes. These block store servers can support a managed block storage service of the cloud provider network. The managed block storage service may be part of the control plane, allowing customers to issue commands via the API to create and manage volumes for their applications running on compute instances. The block store servers can include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host.

The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used).

The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include storage services for one or more object store servers, which represent another type of storage within the cloud provider network. The object storage servers include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A cloud provider network can be formed as a plurality of regions, where a region is a separate geographical area in which the cloud provider has one or more data centers. Each region can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one another such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a communication service provider network). Transit Centers (TCs) are the primary backbone locations linking customers to the cloud provider network and may be co-located at other network provider facilities (e.g., Internet service providers, telecommunications providers). Each region can operate two or more TCs for redundancy. Regions are connected to a global network which includes private networking infrastructure (e.g., fiber connections controlled by the cloud service provider) connecting each region to at least one other region. The cloud provider network may deliver content from points of presence (PoPs) outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Four computing environments 203 are shown by way of non-limiting example, but any number of computing environments 203, including a single computing environment 203, may be used in other examples. Each computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, each computing environment 203 may include a plurality of computing devices that together may comprise a hosted computing resource, a grid computing resource, and/or any other distributed computing arrangement. In some cases, each computing environment 203 may correspond to an elastic computing resource where the allotted capacity of processing, network, storage, or other computing-related resources may vary over time.

Various applications and/or other functionality may be executed in each computing environment 203 according to various embodiments. Also, various data may be stored in a data store that is accessible to the computing environment 203. The data store may be representative of a plurality of data stores as can be appreciated. The data stored in the data store, for example, is associated with the operation of the various applications and/or functional entities described below.

The components executed on the computing environment 203a, 203b, and 203c, for example, include respective processes 206a, 206b, 206c, and other applications, services, processes, systems, engines, or functionality not discussed in detail herein. The respective processes 206 perform arbitrary business logic or other functionality on behalf of the distributed system. The processes 206 may be viewed as subsystems of the overall distributed system. The illustration of three processes 206 is a non-limiting example, and other numbers of processes 206 may be used in other examples. The processes 206 may communicate with one another via a mesh topology, a hub-and-spoke topology, a tree topology, or another network topology. In one scenario, the processes 206 may be distributed across a plurality of regions of a cloud provider network.

The data associated with each respective process 206 includes, for example, a respective process state 209a, 209b, or 209c, respective local snapshots 212a, 212b, or 212c, respective snapshot generation rules 219a, 219b, or 219c, and potentially other data. The process state 209 corresponds to data associated with a process 206 that may be mutated or change as the respective process 206 executes. The process state 209 may include data used by the process 206 to respond to queries or service calls and may be updated based upon receiving queries or service calls. The process state 209 includes a respective current vector clock 215a, 215b, or 215c that may be updated by the process 206 upon each change to the process state 209. In some implementations, the current vector clock 215 may be stored using a data storage or a cache that is local to the process 206 as the current vector clock 215 may be updated frequently.

The current vector clock 215 contains numerical values for each of the processes 206 with which a given process 206 has communicated or otherwise has been made aware through the sharing of current vector clocks 215. In one implementation, the values are 64-bit integers. The values may be initialized to a default value, such as zero, null, or empty, or initialized to a current time. Initializing the values to a current time may ensure that the values are never decreasing, even if there is a fault causing a process 206 to reinitialize a value. The respective value for a given process 206 may be incremented, for example, each time the process state 209 is updated in a way that is relevant to a global snapshot. The respective values for processes 206 other than the given process 206 are learned through the exchange of current vector clocks 215 (e.g., current vector clock 215c) in messages 217. The current vector clocks 215 exchanged in the messages 217 may be serialized objects. In one implementation, vector clocks 215 and 218 may use a hash map data structure rather than a fixed vector or array so that entries for newly discovered processes 206 may be easily added.

The local snapshots 212 correspond to copies of at least a portion of a corresponding process state 209 existing at a particular point in time. The local snapshots 212 are generated by the respective processes 206 asynchronously with respect to each other, potentially spontaneously whenever the snapshot generation would not interfere with the normal operation of the process 206. The local snapshots 212 may be generated based at least in part on a defined cadence parameter or interval, such that the process 206 may use a best effort at generating the local snapshots 212 at the cadence. In other examples, the local snapshots 212 are generated when a process 206 receives a message or when the process state 209 changes. The respective local snapshots 212 may be ordered by time of creation. When a local snapshot 212 is generated, the current vector clock 215 for the process 206 is copied into the local snapshot 212 as the snapshot vector clock 218 (e.g., the snapshot vector clock 218a, 218b, or 218c).

The snapshot generation rules 219 configure how the processes 206 generate the respective local snapshots 212, which may vary among the different processes 206. For example, the snapshot generation rules 219 may define the cadence at which the local snapshots 212 are generated. Also, the cadence may vary based upon a frequency of state changes of the process 206, the latency involved in generating the local snapshot 212, the rate of communication among different processes 206, and/or other factors.

The components executed on the computing environment 203d, for example, includes the snapshotting agent 221 and other applications, services, processes, systems, engines, or functionality not discussed in detail herein. The snapshotting agent 221 is executed to generate global consistent snapshots 224 for the distributed system from a collection of local snapshots 227 gathered from the respective processes 206. Specifically, the snapshotting agent 221 analyzes a collection of local snapshots 227, which may be the most recent set of each, or the most recent set relative to a particular past point in time, and determines using the snapshot vector clocks 218 whether the collection of local snapshots 227 is consistent or inconsistent. If the set is inconsistent, the snapshotting agent 221 may replace one or more of the local snapshots 212 in the collection of local snapshots 227 with a previous local snapshot 212 for the respective process(es) 206, and determine whether the modified collection of local snapshots 227 is consistent. This can be repeated any number of times until a global consistent snapshot 224 is found. In some scenarios, based upon factors such as the mutation rate, the snapshot rate, and the messaging rate, a global consistent snapshot 224 may be relatively old or may not be able to be identified.

In some embodiments, individual processes 206 may correspond to distributed systems themselves, which may implement the snapshotting architecture with a respective snapshotting agent 221 as described herein. That is to say, a local snapshot 212 may actually correspond to a global consistent snapshot 224 for the distributed system implementing the process 206. However, this may not affect how the local snapshot 212 is treated or processed relative to local snapshots 212 of other processes 206 that are not nested distributed systems. Thus, the snapshotting architecture may be nested any number of times when portions of a distributed system are distributed systems themselves.

The snapshotting agent 221 may implement an application programming interface (API) to allow users or services to performs functions such as to determine whether a collection of local snapshots 227 constitute a global consistent snapshot 224, generate or query a portion of a most recent global consistent snapshot 224, generate or query a portion of a global consistent snapshot 224 that is most recent relative to a particular time in the past, and/or other functions. In some embodiments, the snapshotting agent 221 may generate one or more user interfaces, such as network pages and application screens, that facilitate interactively performing the API functions and/or retrieving the results.

Figure 3:
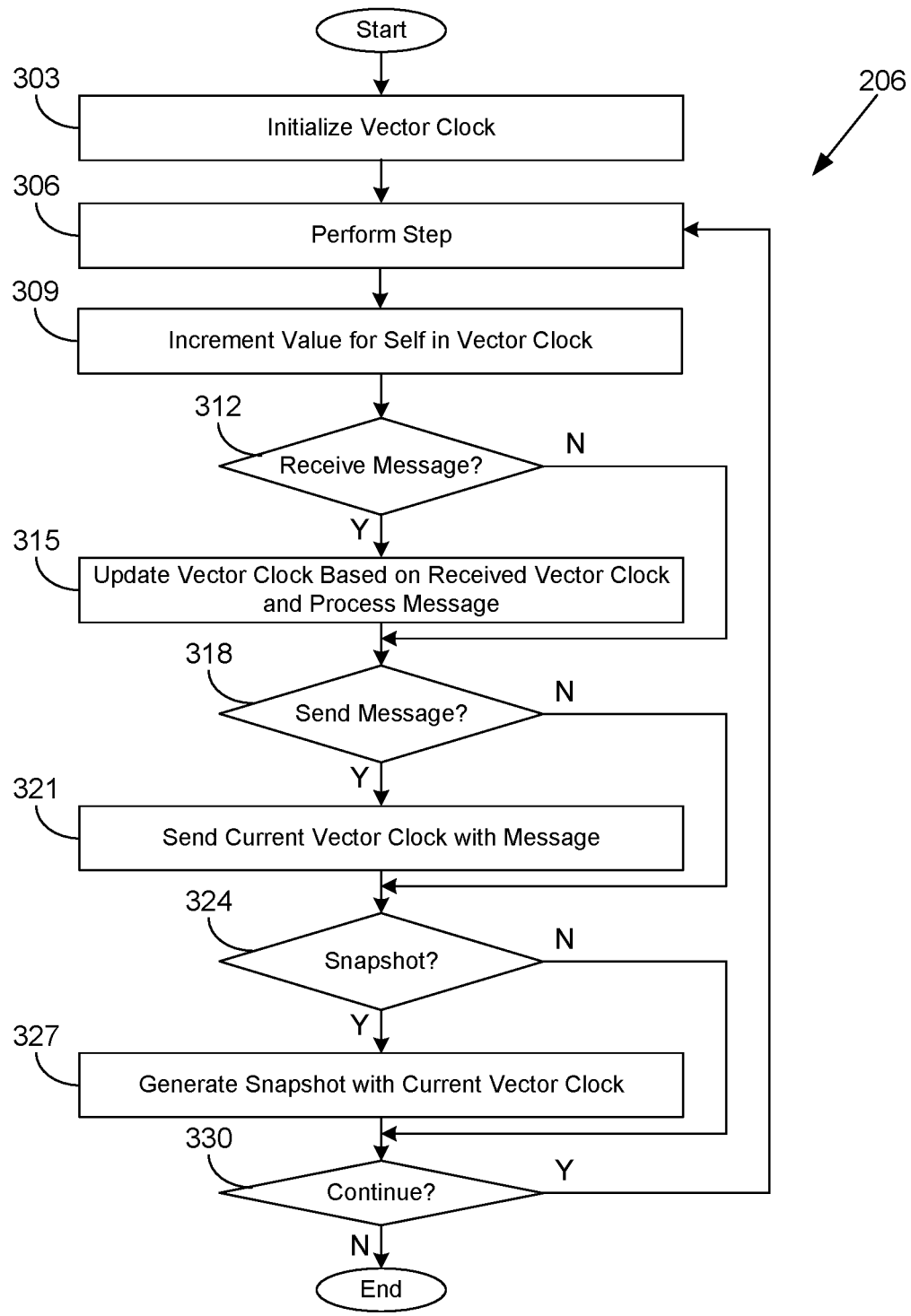
FIG. 3 is a flowchart illustrating one example of functionality implemented as portions of a process executed in a computing environment in the networked environment of FIG. 2 according to various embodiments of the present disclosure.

Referring next to FIG. 3, shown is a flowchart that provides one example of the operation of a portion of the process 206 according to various embodiments. It is understood that the flowchart of FIG. 3 provides merely an example of the many different types of functional arrangements that may be employed to implement the operation of the portion of the process 206 as described herein. As an alternative, the flowchart of FIG. 3 may be viewed as depicting an example of elements of a method implemented in the computing environment 203a (FIG. 2) according to one or more embodiments.

Beginning with box 303, the process 206 initializes its current vector clock 215 (FIG. 2). In one example, all entries or values are set to a default value, such as 0, 1, or another value. In another example, one or more entries or values are set to a current time. In another example, the default value may be a null or empty value, or entries may simply not exist until they are updated.

In box 306, the process 206 performs an step that may alter the process state 209 (FIG. 2). The step may correspond to performing an operation relating to business logic implemented by the process 206. For example, the step may constitute a linearizable step.

In box 309, the process 206 increments the value corresponding to itself in the current vector clock 215. In one embodiment, this represents that the process state 209 has changed as a result of the step in a way that is relevant to the global snapshot. In other embodiments, the value may be incremented arbitrarily without respect to whether the process state 209 has actually changed or without respect to whether the change to the process state 209 is relevant to the global snapshot. The other values in the current vector clock 215 remain unchanged.

In box 312, the process 206 determines whether a message 217 (FIG. 2) is received from another process 206. If a message 217 is received, the process 206 continues to box 315 and updates the values of the current vector clock 215 of the process 206 based upon the values in the current vector clock 215 in the message 217 sent by the other process 206. The update comprises replacing values with a pairwise maximum on the corresponding values for respective processes 206 in the two current vector clocks 215. Afterward, the process 206 proceeds to box 318. If a message 217 is not received in box 312, the process 206 proceeds from box 312 to box 318.

In box 318, the process 206 determines whether to send a message 217 to another process 206. If the process 206 determines to send the message 217, the process 206 proceeds to box 321 and sends its current vector clock 215 along with the message 217 to the other process 206. Afterward, the process 206 proceeds to box 324. If it is determined not to send a message 217 in box 318, the process 206 proceeds from box 318 to box 324.

In box 324, the process 206 determines whether to take a local snapshot 212 (FIG. 2). The process 206 may determine to take a local snapshot 212 spontaneously when not otherwise occupied and without delaying the operation of the process 206, according to a cadence, or otherwise as directed by the snapshot generation rules 219 (FIG. 2). For example, the process 206 may take a local snapshot 212 in response to receiving a message 217 (FIG. 2) from another process 206 or in response to a change in the process state 209. If the process 206 determines to take the local snapshot 212, the process 206 continues to box 327 and generates the local snapshot 212 according to the snapshot generation rules 219. For example, the process 206 may copy at least a portion of the process state 209 into the local snapshot 212, including the current vector clock 215. Thereafter, the process 206 continues to box 330. If the process 206 determines not to take a local snapshot 212 in box 324, the process 206 instead moves from box 324 to box 330.

In box 330, the process 206 determines whether to continue executing. If the process 206 continues executing, the process 206 then returns to box 306 and performs another step. Otherwise, the operation of the process 206 proceeds to completion.

Figure 4A:
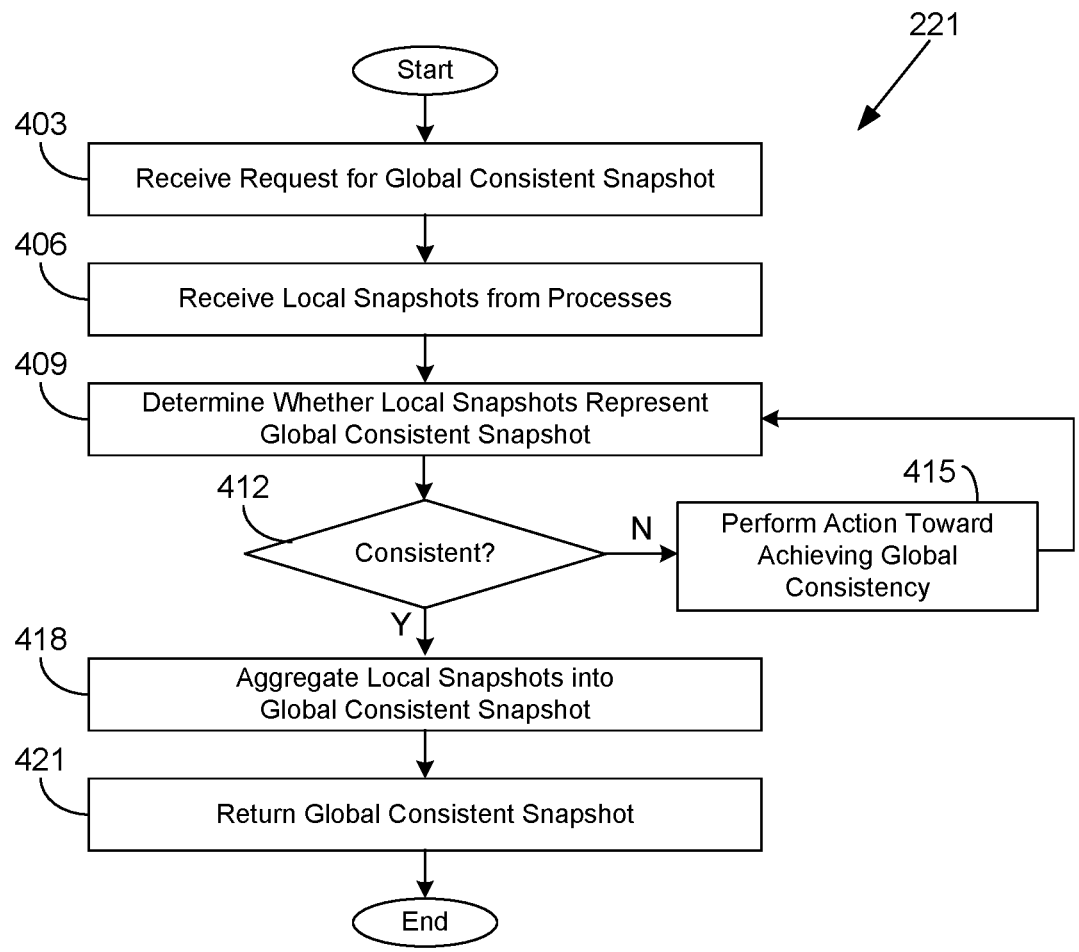
FIGS. 4A and 4B are flowcharts illustrating examples of functionality implemented as portions of a snapshotting agent executed in a computing environment in the networked environment of FIG. 2 according to various embodiments of the present disclosure.

Moving on to FIG. 4A, shown is a flowchart that provides one example of the operation of a portion of the snapshotting agent 221 according to various embodiments. It is understood that the flowchart of FIG. 4A provides merely an example of the many different types of functional arrangements that may be employed to implement the operation of the portion of the snapshotting agent 221 as described herein. As an alternative, the flowchart of FIG. 4A may be viewed as depicting an example of elements of a method implemented in the computing environment 203d (FIG. 2) according to one or more embodiments.

Beginning with box 403, the snapshotting agent 221 receives a request for a global consistent snapshot 224 (FIG. 2) or a portion thereof via an API. Alternatively, the snapshotting agent 221 may receive a query to be executed on the global consistent snapshot 224. In some scenarios, the request may specify a past time for which a global consistent snapshot 224 most recent to the past time is desired. Otherwise, the request may be for a most recent global consistent snapshot 224. In other scenarios, the snapshotting agent 221 may automatically determine to generate a global consistent snapshot 224 periodically according to a defined cadence parameter.

In box 406, the snapshotting agent 221 receives a collection of local snapshots 227 (FIG. 2) from individual ones of a plurality of processes 206 (FIG. 2). The snapshotting agent 221 may send API requests to each of the processes 206 in order to obtain the local snapshots 212 (FIG. 2), or the snapshotting agent 221 may query one or more data storage services in order to obtain copies of the local snapshots 212 originated by the respective processes 206. The local snapshots 212 that are obtained include the most recent, or the most recent before a specified time. The local snapshots 212 are generated by the processes 206 at least partially asynchronously with respect to the snapshotting agent 221. In other words, the snapshotting agent 221 does not cause the local snapshots 212 to be generated, but the snapshotting agent 221 simply retrieves them from the processes 206.

In box 409, the snapshotting agent 221 determines whether the collection of local snapshots 227 represents a global consistent snapshot 224. To this end, the snapshotting agent 221 performs a comparison of the snapshot vector clocks 218 (FIG. 2) in each local snapshot 212 to determine whether, for each particular process 206 of the plurality of processes 206, the value corresponding to the particular process 206 in a snapshot vector clock 218 of the particular process 206 is greater than or equal to respective values for the particular process 206 in the other snapshot vector clocks 218 of the other processes 206. If this condition holds true for each of the processes 206 and each of the respective snapshot vector clocks 218, the collection of local snapshots 227 represents a global consistent snapshot 224. Otherwise, the collection of local snapshots 227 is inconsistent.

If the snapshotting agent 221 determines that the collection of local snapshots 227 is inconsistent in box 412, the snapshotting agent 221 may proceed to box 415 and performs one or more actions toward achieving global consistency. In one scenario, the snapshotting agent 221 may replace one or more particular local snapshots 212 in the collection of local snapshots 227 with one or more previous local snapshots 212. In this regard, as in FIG. 4B, the snapshotting agent 221 may generate a directed graph where each first local snapshot 212 for a first process 206 is a node having an arc to another node corresponding to a second local snapshot 212 for a second process 206 if the first local snapshot 212 "happens before" the second local snapshot 212. In one embodiment, a first node "happens before" a second node if the first node has no vector clock entry that is greater than the corresponding entry of the vector clock of the second node, and at least one entry of the first node's vector clock is less than the corresponding entry of the second node's vector clock. The snapshotting agent 221 may then locate a node with an N-degree where an arc goes into the node. The snapshotting agent 221 may remove that node from the graph, and replace the local snapshot 212 of the removed node with the previous version of the local snapshot 212 corresponding to the node leading into the removed node.

In another scenario, the snapshotting agent 221 may simply wait until one or more updated local snapshots 212 are received. For example, the collection of local snapshots 227 may be consistent except for one local snapshot 212 that is relatively old and causing the inconsistency. Thus, it may be an acceptable strategy for the snapshotting agent 221 to wait for some time period (e.g., defined by a threshold) for an updated version of the local snapshot 212 to be received. Afterward, the snapshotting agent 221 may return to box 409 and reevaluate the modified collection of local snapshots 227 for consistency.

If the snapshotting agent 221 determines that the collection of local snapshots 227 is consistent in box 412, the snapshotting agent 221 proceeds to box 418 and aggregates the local snapshots 212 from the collection of local snapshots 212 into the global consistent snapshot 224. In box 421, the snapshotting agent 221 returns the global consistent snapshot 224 or a portion thereof in response to the original request. Alternatively, the snapshotting agent 221 may store the global consistent snapshot 224 in a data storage service, or return the results of a query performed against the global consistent snapshot 224. In some scenarios, the global consistent snapshot 224 may be too old beyond a threshold parameter, which may cause the snapshotting agent 221 to alter the snapshot generation rules 219 (FIG. 2), such as the cadence parameters. Thereafter, the operation of the portion of the snapshotting agent 221 ends.

Figure 4B:
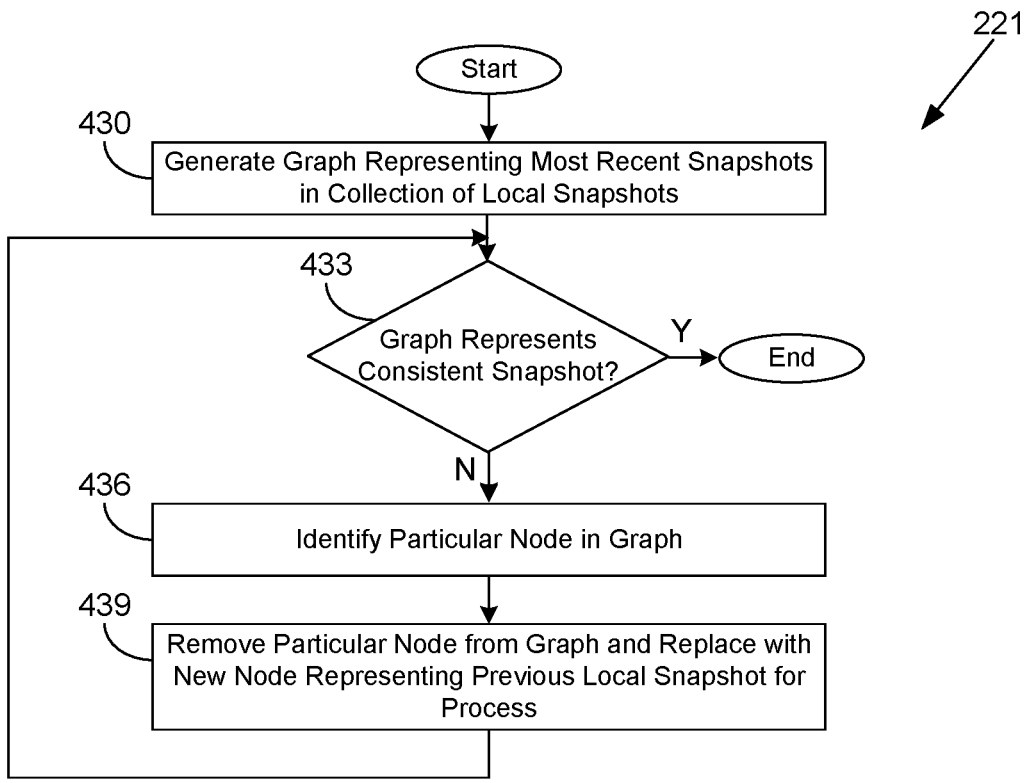

Turning to FIG. 4B, shown is a flowchart that provides one example of the operation of a portion of the snapshotting agent 221 according to various embodiments. It is understood that the flowchart of FIG. 4B provides merely an example of the many different types of functional arrangements that may be employed to implement the operation of the portion of the snapshotting agent 221 as described herein. As an alternative, the flowchart of FIG. 4B may be viewed as depicting an example of elements of a method implemented in the computing environment 203d (FIG. 2) according to one or more embodiments.

Beginning with box 430, the snapshotting agent 221 generates a directed graph representing the most recent local snapshots 212 (FIG. 2) from a collection of local snapshots 227 (FIG. 2) for each process 206. The graph comprises a set of nodes, where each node individually represents a particular local snapshot 212 for a respective process 206, and a set of arcs, where each arc from a first node to a second node individually represents a local snapshot 212 for a first process 206 (i.e., a first node) "happening before" a local snapshot 212 for a second process 206 (i.e., a second node). In one embodiment, one node per process 206 is included in the graph.

Because a first node does not "happen before" a second node while simultaneously the second node "happens before" the first node, the directed graph does not contain cycles. As a directed acyclic graph, the graph either has no arcs, or the graph has a node with at least one inwardly directed arc and no outwardly directed arcs.

In box 433, the snapshotting agent 221 determines whether the graph represents a global consistent snapshot 224 (FIG. 2). For example, if the graph contains no arcs, the local snapshots 212 represented by the graph correspond to the global consistent snapshot 224. If the snapshotting agent 221 determines that the graph does represent a global consistent snapshot 224, the operation of the portion of the snapshotting agent 221 ends.

Otherwise, if the graph does not represent a global consistent snapshot 224, the snapshotting agent 221 moves to box 436 and identifies a particular node to remove from the graph. For example, the snapshotting agent 221 may identify a particular node that has one or more inwardly directed arcs to the node but no arcs outwardly directed from the node.

In box 439, the snapshotting agent 221 removes the particular node from the graph and replaces the particular node with a node corresponding to a prior local snapshot 212 for the same process 206. Subsequently, the snapshotting agent 221 returns to box 433 and reassesses whether the graph as modified represents a global consistent snapshot 224.

In various implementations, initializing the graph happens in $\Theta(p^2)$ time, where p is the number of processes. This is because every pair of nodes is assessed as to whether the corresponding process's local snapshot 212 "happened before" the other processes' local snapshot 212. Updating the graph on each iteration happens in $\Theta(p)$ time, as each node's relationship to the one added node is checked. The number of iterations may be bounded above by the total number of local snapshots 212 considered across all processes 106, N. Hence the total run time of this approach may be $O(p^2+Np)$.

Figure 5:
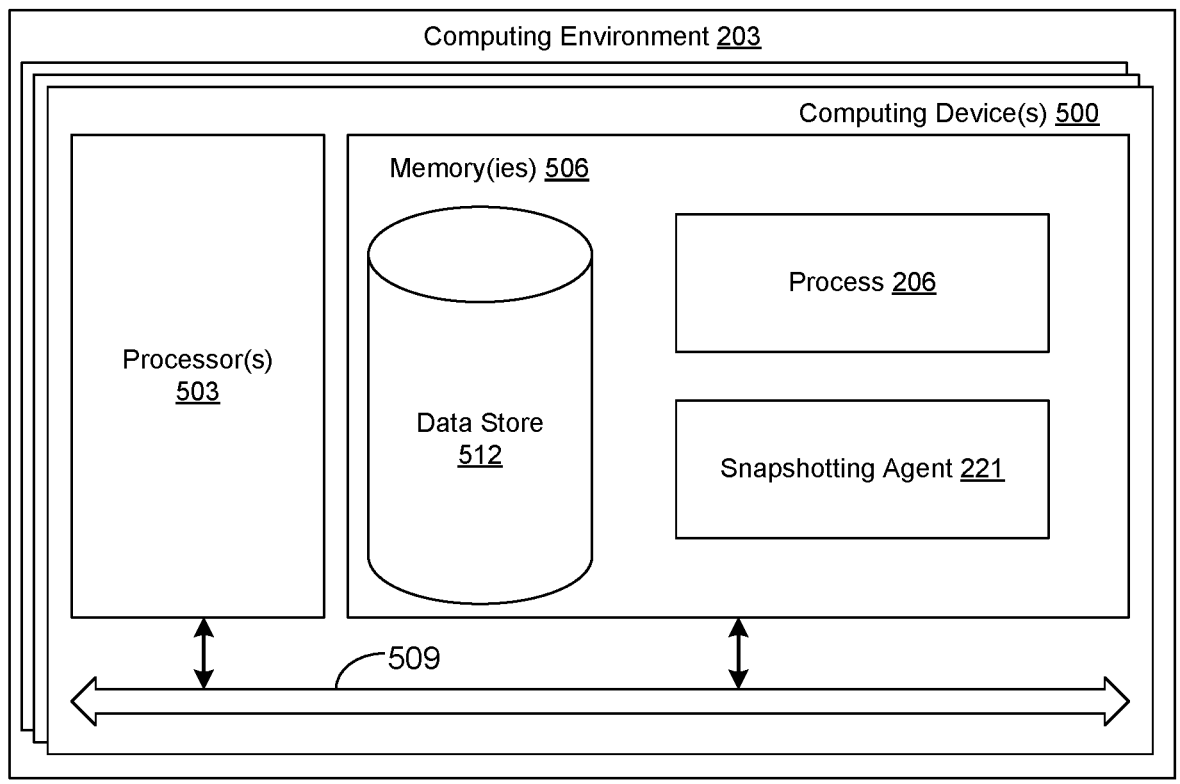
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are one or more processes 206, the snapshotting agent 221, and potentially other applications. Also stored in the memory 506 may be a data store 512 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the processes 206, the snapshotting agent 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-4B show the functionality and operation of an implementation of portions of the processes 206 and the snapshotting agent 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4B show a specific order of execution, it is understood that the order of execution may differ from that which is depicted. For example, the order of execution of two or more blocks may be scrambled relative to the order shown. Also, two or more blocks shown in succession in FIGS. 3-4B may be executed concurrently or with partial concurrence. Further, in some embodiments, one or more of the blocks shown in FIGS. 3-4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the processes 206 and the snapshotting agent 221, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the processes 206 and the snapshotting agent 221, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a cloud provider network including a plurality of regions;
    a distributed system having a plurality of processes that are implemented across at least two of the plurality of regions; and
    at least one computing device in the cloud provider network configured to at least:
        receive, by a first process of the plurality of processes, a corresponding vector clock from a second process of the plurality of processes, each corresponding vector clock comprising respective values indicating respective state changes in a corresponding process of the plurality of processes and other processes of the plurality of processes, the first process being implemented in a first region of the plurality of regions and the second process being implemented in a second region of the plurality of regions;
        update, by the first process, the corresponding vector clock of the first process using a pairwise maximum of values from the corresponding vector clock received from the second process;
        receive, by a snapshotting agent, a respective local snapshot for individual ones of the plurality of processes, the respective local snapshot for the corresponding process including the corresponding vector clock for the corresponding process, the respective local snapshot being generated by the corresponding process at least partially asynchronously with respect to the snapshotting agent; and
        determine, by the snapshotting agent, whether a collection of the respective local snapshots for the individual ones of the plurality of processes represents a global consistent snapshot for the distributed system based at least in part on a comparison of the respective values of the corresponding vector clocks.

2. The system of claim 1, wherein the at least one computing device is further configured to at least aggregate, by the snapshotting agent, the collection of the respective local snapshots into the global consistent snapshot in response to determining that the collection of the respective local snapshots represents the global consistent snapshot.

3. The system of claim 1, wherein the individual ones of the plurality of processes are configured to generate the respective local snapshots based at least in part on at least one of: a cadence parameter, in response to receiving a message from another process, or in response to a state change.

4. The system of claim 1, wherein the at least one computing device is further configured to at least:
   determine, by the snapshotting agent, that the collection of the respective local snapshots does not represent the global consistent snapshot;
   receive, by the snapshotting agent, at least one previous respective local snapshot for one or more of the plurality of processes;
   replace, by the snapshotting agent, at least one respective local snapshot in the collection with the at least one previous respective local snapshot; and
   determine, by the snapshotting agent, whether the collection modified to include the at least one previous respective local snapshot represents the global consistent snapshot for the distributed system based at least in part on a comparison of the respective values of the corresponding vector clocks.

5. The system of claim 4, wherein the at least one previous respective local snapshot is identified based at least in part on:
   generating a graph representing the collection of the respective local snapshots, the graph including a set of nodes that individually represent a respective local snapshot for a corresponding process, and a set of arcs that individually represent a first local snapshot for a first process happening before a second local snapshot for a second process; and
   identifying the at least one previous respective local snapshot based at least on identifying at least one node to remove from the graph.

6. The system of claim 1, wherein the at least one computing device is further configured to at least:
   determine, by the snapshotting agent, that the collection of the respective local snapshots does not represent the global consistent snapshot;
   wait, by the snapshotting agent, a time period until at least one updated respective local snapshot is received for one or more of the plurality of processes;
   replace, by the snapshotting agent, at least one respective local snapshot in the collection with the at least one updated respective local snapshot; and
   determine, by the snapshotting agent, whether the collection modified to include the at least one updated respective local snapshot represents the global consistent snapshot for the distributed system based at least in part on a comparison of the respective values of the corresponding vector clocks.

7. A computer-implemented method, comprising:
   receiving, by a snapshotting agent, a respective local snapshot for individual ones of a plurality of processes in a distributed system, the respective local snapshot for a corresponding process of the individual ones of the plurality of processes including a corresponding vector clock that comprises respective values indicating respective state changes in the corresponding process and other processes of the plurality of processes, the respective local snapshot being generated by the corresponding process at least partially asynchronously with respect to the snapshotting agent; and
   determining, by the snapshotting agent, whether a collection of the respective local snapshots for the individual ones of the plurality of processes represents a global consistent snapshot for the distributed system based at least in part on a comparison of the respective values of the corresponding vector clocks.

8. The computer-implemented method of claim 7, further comprising incrementing, by the corresponding process, a respective value in the corresponding vector clock to indicate a respective state change in the corresponding process.

9. The computer-implemented method of claim 7, further comprising:
   receiving, by the corresponding process, a different vector clock from a different process of the plurality of processes; and
   updating, by the corresponding process, the respective values of the corresponding vector clock by using a pairwise maximum of the respective values of the different vector clock.

10. The computer-implemented method of claim 9, further comprising copying, by the corresponding process, a particular value from the different vector clock to the corresponding vector clock, the particular value corresponding to another process of the plurality of processes not yet represented in the corresponding vector clock.

11. The computer-implemented method of claim 7, further comprising sending, by the corresponding process, a serialized version of the corresponding vector clock to a different process of the plurality of processes in a message to the different process.

12. The computer-implemented method of claim 7, further comprising providing, by the snapshotting agent, at least a portion of the global consistent snapshot based at least in part on aggregating the collection of the respective local snapshots in response to determining that the collection represents the global consistent snapshot.

13. The computer-implemented method of claim 7, wherein determining whether the collection of the respective local snapshots for the individual ones of the plurality of processes represents the global consistent snapshot for the distributed system further comprises verifying that a respective value for the corresponding process in the corresponding vector clock of the corresponding process is greater than or equal to a respective value for the corresponding process in other corresponding vector clocks of the other processes.

14. The computer-implemented method of claim 7, wherein the individual ones of the plurality of processes are configured to generate the respective local snapshots without delaying operations of the individual ones of the plurality of processes.

15. The computer-implemented method of claim 7, further comprising:
   determining, by the snapshotting agent, that the collection of the respective local snapshots does not represent the global consistent snapshot;
   receiving, by the snapshotting agent, at least one different respective local snapshot for one or more of the plurality of processes;
   replacing, by the snapshotting agent, at least one respective local snapshot in the collection with the at least one different respective local snapshot; and
   determining, by the snapshotting agent, whether the collection modified to include the at least one different respective local snapshot represents the global consistent snapshot for the distributed system based at least in part on a comparison of the respective values of the corresponding vector clocks.

16. The computer-implemented method of claim 15, further comprising identifying the at least one different respective local snapshot based at least in part on:
- generating a graph representing the collection of the respective local snapshots, the graph including a set of nodes that individually represent a respective local snapshot for a corresponding process, and a set of arcs that individually represent a first local snapshot for a first process happening before a second local snapshot for a second process; and
- identifying the at least one different respective local snapshot based at least on identifying at least one node to remove from the graph.

17. A computer-implemented method, comprising:
- generating a graph representing a collection of most recent local snapshots respectively generated by individual ones of a plurality of processes in a distributed system, the graph including a set of nodes that individually represent a respective local snapshot and a vector clock for a corresponding process, and a set of arcs that individually represent a first local snapshot for a first process happening before a second local snapshot for a second process;
- identifying a first node to remove from the graph when a first node's vector clock has no entry greater than a second node's vector clock, and at least one entry of the first node's vector clock is less than the corresponding entry of the second node's vector clock;
- replacing the first node with a second node that represents a prior local snapshot for a respective process of the first node; and
- determining whether the collection of most recent local snapshots corresponding to the graph represents a global consistent snapshot.

18. The computer-implemented method of claim 17, further comprising identifying the first node based at least in part on the first node having one or more arcs inwardly directed to the first node and no arcs outwardly directed from the first node.

19. The computer-implemented method of claim 17, further comprising:
- determining that the collection of most recent local snapshots does not represent the global consistent snapshot;
- replacing a third node from the graph with a fourth node that represents another prior local snapshot for a respective process of the third node; and
- determining whether the collection of most recent local snapshots corresponding to the graph represents a global consistent snapshot.

20. The computer-implemented method of claim 17, wherein the individual ones of the plurality of processes are configured to generate respective local snapshots at least partially asynchronously with respect to a snapshotting agent.

* * * * *